(12) United States Patent
Leason

(10) Patent No.: US 10,639,813 B2
(45) Date of Patent: May 5, 2020

(54) TOOL FOR WRAPPING PAPER MANUFACTURED BY 3D PRINTING

(71) Applicant: David Leason, Chappaqua, NY (US)

(72) Inventor: David Leason, Chappaqua, NY (US)

( * ) Notice: Subject to any disclaimer, the term of this patent is extended or adjusted under 35 U.S.C. 154(b) by 94 days.

(21) Appl. No.: 15/859,683

(22) Filed: Jan. 1, 2018

(65) Prior Publication Data

US 2018/0117784 A1 May 3, 2018

Related U.S. Application Data

(62) Division of application No. 14/583,381, filed on Dec. 26, 2014, now Pat. No. 9,868,222.

(51) Int. Cl.
*B26F 3/02* (2006.01)
*B26D 1/02* (2006.01)
*B26D 1/00* (2006.01)
*B33Y 80/00* (2015.01)

(52) U.S. Cl.
CPC .............. *B26F 3/02* (2013.01); *B26D 1/0006* (2013.01); *B26D 1/025* (2013.01); *B26D 2001/002* (2013.01); *B33Y 80/00* (2014.12)

(58) Field of Classification Search
CPC .... Y10T 225/30; B26D 1/025; B26D 1/0006; B26D 2001/002; B33Y 80/00; B26F 3/00; B26F 3/02; B26F 3/002
See application file for complete search history.

(56) References Cited

U.S. PATENT DOCUMENTS

| 897,086 | A | * | 8/1908 | Grand |
|---|---|---|---|---|
| 2,331,791 | A | | 10/1943 | Noel |
| 2,345,190 | A | | 3/1944 | Freund |
| D185,052 | S | * | 4/1959 | Warp .............................. D6/518 |
| 3,031,817 | A | | 5/1962 | Parks |
| 3,770,118 | A | | 11/1973 | Jones |
| 3,987,897 | A | | 10/1976 | Smith |
| 4,453,657 | A | * | 6/1984 | Kuehn ................. B65D 85/672 225/65 |
| 4,781,316 | A | | 11/1988 | Freeberg |

(Continued)

OTHER PUBLICATIONS

3M Corporation, "Scotch Cutter Home," Gift Wrap Cutter, copyright 2010 (printed Jan. 24, 2015), 2 pages, 3M.com/brands/scotch/cutters/index/html, USA.

(Continued)

*Primary Examiner* — Phong H Nguyen
(74) *Attorney, Agent, or Firm* — Leason Ellis LLP

(57) ABSTRACT

A tool for use with wrapping paper is manufactured by a process comprising the step of causing a 3D printer to make the tool using an instruction file which is accessible to the 3D printer. The instruction file includes instructions for a hardware processor which define actions to be taken at and by the 3D printer to manufacture the tool. The tool manufactured in accordance with the instruction file comprises a unitary, plastic stick having a length which extends along an axis of elongation, a broad surface, a bracing surface, and first and second opposing sides extending along the length, separated by a width which is substantially less than the length. The first aide has serrations defined in the plastic stick adjacent the bracing surface. The second side has a non-serrated edge defined in the plastic stick proximate to the bracing surface.

16 Claims, 3 Drawing Sheets

(56) References Cited

U.S. PATENT DOCUMENTS

| | | | |
|---|---|---|---|
| 5,480,080 A | 1/1996 | Ferguson | |
| 5,787,781 A | 8/1998 | Hile | |
| 5,850,960 A | 12/1998 | Cadwell | |
| 6,227,360 B1 | 5/2001 | Kessler | |
| 6,786,376 B1 | 9/2004 | Pitzen | |
| 2007/0214671 A1* | 9/2007 | Campagna | B43L 7/00 33/492 |

OTHER PUBLICATIONS

Gift Tools Inc., "About," Wrapmaster, copyright 2013 (printed Jan. 24, 2015), 2 pages, giftwraptools.com/about.html, USA.

Gift Tools Inc., "How to Use Your Wrapmaster," copyright 2013 (printed Jan. 24, 2015), 1 page, giftwraptools.com/instructions.html, USA.

* cited by examiner

TOOL FOR WRAPPING PAPER MANUFACTURED BY 3D PRINTING

CROSS-REFERENCE TO RELATED CASE

This is a divisional application of U.S. application Ser. No. 14/583,381, entitled "Tool for Wrapping Paper and Kit for Containing Same," filed on Dec. 26, 2014, now granted.

FIELD OF THE INVENTION

The present invention relates to wrapping paper accessories, and more particularly to a tool and kit useful in cutting wrapping paper to a desired size.

BACKGROUND OF THE INVENTION

Wrapping paper is typically available in rolls, and the paper is dispensed from the roll for cutting to size. Some wrapping paper is folded, but similarly needs to be cut to size.

For individuals, the typical approach to cutting wrapping paper, whether for gifts, crafts, packaging, or another purpose, is to use a scissor. Cutting a long sheet of paper with a scissor, however, is difficult and may not result in a straight line cut. If the cut is not straight, the workpiece just cut may not fit the intended purpose (e.g., may not be large enough across the length to cover an article). In addition, the remaining paper on the other side of the cut will not be straight. Another approach used by individuals for cutting wrapping paper is to use a cutting tool designed to slide along the paper to create a smoother cut. One example is the Scotch brand Gift Wrap Cutter which has a blade disposed within a slot. This device cuts paper inserted into the slot by having the user push the device forward while holding the paper next to the cutter. The device can cut a straight line, but the line may not be perpendicular to the paper roll, and paper snags and ripping can result if the user's hand, which is holding down the paper, does not advance with the cutter.

For businesses and persons having a need to cut wrapping paper smoothly, there are wrapping paper dispensers which support one or more rolls of paper on respective dowels, and which cut the paper along the edge of a spring-loaded blade. Such dispensers are effective, but require set up, space, and are not well suited for casual use by individuals.

The present invention addresses these deficiencies in the art.

SUMMARY OF THE INVENTION

In accordance with one aspect of the invention, a tool for use with wrapping paper comprises a unitary, plastic stick having a length which extends linearly along an axis of elongation, a broad surface, a bracing surface, and first and second sides along the length which meet the bracing surface at respective first and second side edges. The tool has a length of at least 18 inches. The first side extends parallel to the axis of elongation and has serrations defined in the plastic stick. The serrations are adjacent the bracing surface and are parallel to the bracing surface and any wrapping paper upon which the bracing surface may be disposed. The second side also extends parallel to the axis of elongation, opposite to the first side, and has a non-serrated edge defined in the plastic stick. The first and second sides are separated by a width which is substantially less than the length.

In accordance with further aspects of the invention, each of which can be included singly or in combination with one another, the tool optionally can have a non-skid feature on the bracing surface. The non-skid feature can be a coating or layer, and is characterized in having a coefficient of static friction greater than that of the plastic comprising the plastic stick.

Also, the tool optionally can have a lip, depending downward from at least one end of the bracing surface of the plastic stick. The lip, if provided, includes a wall which is perpendicular to the axis of elongation which defines a seat for an edge of the wrapping paper. The lip enables the tool to self-orient to be perpendicular to the edge of the wrapping paper when the wrapping paper edge is fully seated against the wall.

Another feature that optionally can be included is to have the plastic stick formed from a transparent or translucent material.

Still another feature that optionally can be included is to have the serrations extend to at least one end of the length of the plastic stick.

Yet another feature that optionally can be included is to have the non-serrated edge of the second side tapered or rounded to provide a guide for concealing serrations in cut paper when wrapping an object.

In a further aspect of the invention, the plastic stick can have an arch extending in the direction of elongation between the first and second sides. If the plastic stick has flexibility, the arch can move from a first curvature to a second, greater curvature in a flexed condition in response to a manual force being applied to the broad surface.

Yet another aspect of the invention is a wrapping paper kit which includes wrapping paper wound about an axis and having a hollow central core, a unitary, plastic stick sized and shaped so as to be disposable within the hollow central core, and a clear plastic wrap enclosing the wrapping paper and the plastic stick within the hollow central core. In accordance with this aspect of the invention, the plastic stick is a unitary member having a length which extends linearly along an axis of elongation, a broad surface, a bracing surface, and first and second sides along the length which meet the bracing surface at respective first and second side edges. The stick has a length of at least 18 inches. The first side extends parallel to the axis of elongation and has serrations defined in the plastic stick. The serrations are adjacent the bracing surface and are parallel to the bracing surface and any wrapping paper upon which the bracing surface may be disposed. The second side also extends parallel to the axis of elongation, opposite to the first side, and has a non-serrated edge defined in the plastic stick. The first and second sides are separated by a width which is substantially less than the length. Moreover, the plastic stick can have any or all of the features noted above, including, without limitation, the non-skid feature, the lip, transparency or translucency, and an arch.

In accordance with still another aspect of the invention, a tool for use with wrapping paper is manufactured by a process comprising the step of causing a 3D printer to make the tool using an instruction file which is accessible to the 3D printer. The instruction file includes instructions for a hardware processor which define actions to be taken by the 3D printer to manufacture the tool. The tool manufactured in accordance with the instruction file comprises a unitary member having a length which extends linearly along an axis of elongation, a broad surface, a bracing surface, and first and second sides along the length which meet the bracing surface at respective first and second side edges. The tool has a length of at least 18 inches. The first side extends parallel to the axis of elongation and has serrations defined in the plastic stick. The serrations are adjacent the bracing surface and are parallel to the bracing surface and any wrapping paper upon which the bracing surface may be disposed. The second side also extends parallel to the axis of elongation, opposite to the first side, and has a non-serrated edge defined in the plastic stick. The first and second sides are separated by a width which is substantially less than the length. Moreover, the tool can have any or all of the features noted above, including, without limitation, the non-skid feature, the lip, transparency or translucency, and an arch.

These and other aspects, features and advantages will be apparent with reference to the accompanying drawing figures and discussion of certain embodiments of the invention.

BRIEF DESCRIPTION OF THE DRAWING FIGURES

FIG. 3 is a side plan view showing details of the tool of FIG. 1, taken along line 3-3.

DETAILED DESCRIPTION OF CERTAIN EMBODIMENTS

By way of overview and introduction, a tool for use with wrapping paper and a kit combining a roll of wrapping paper and the tool are described with reference to the accompanying drawing FIGS. 1-4, which illustrate certain embodiments of the invention. The tool combines a bracing surface and a cutter to trim paper (e.g., from a roll) to a desired size without slippage. Preferably, the tool has a length which generally approximates the width of a roll of wrapping paper, to thereby brace the entire width and permit the cutting of a segment of paper from the roll without repositioning the tool or changing one's hold of the paper. As detailed below, embodiments can include one or more additional features such as an anti-slip coating or layer to better ensure that the paper is braced, a lip to engage an edge of the paper and self-orient the tool for a perpendicular cut (i.e., a cut parallel to the axis of the rolled wrapping paper), an arch configured to flex under manual pressure and further restrain the paper from movement under the tool, and an edge shaped to facilitate folding of a cut-paper edge for a more beautiful finish of the wrapped item.

Figure 1:
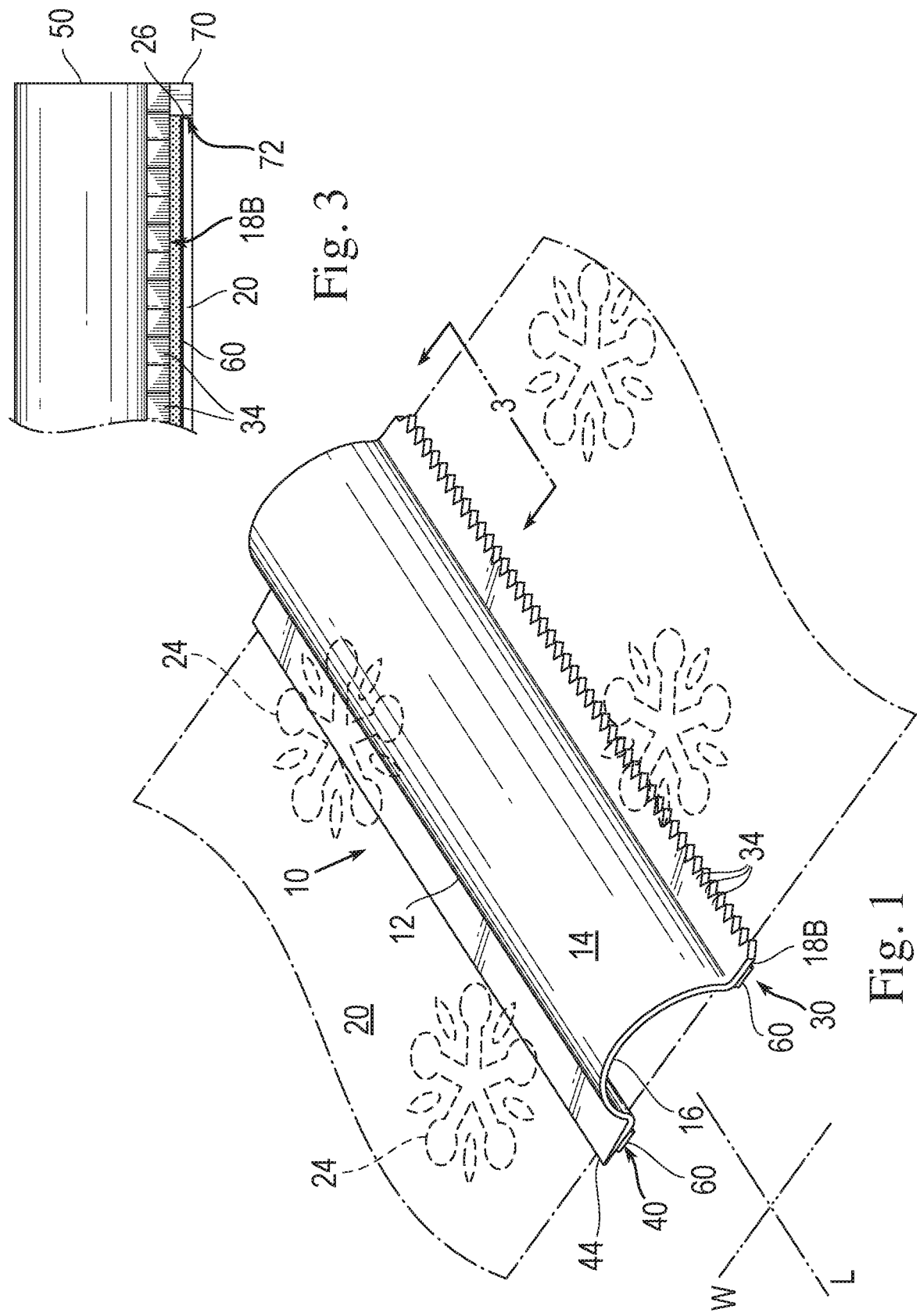
FIG. 1 is a top perspective view of a tool in accordance with one embodiment of the invention, shown in relation to a swatch of wrapping paper.

Referring now to FIG. 1, a tool 10 in accordance with an embodiment of the invention is illustrated in a position disposed on top of a swatch of wrapping paper 20, such as may have been unrolled from, but still attached to, a roll of wrapping paper (not shown).

The tool comprises a unitary, plastic stick 12 as can be made by extrusion, or by using a mold, by printing in three-dimensions, or by die cutting. The stick 12 has a length which extends linearly along an axis of elongation L. The length of the plastic stick is at least eighteen inches so as to provide an elongated bracing surface to act upon the paper, as described below. In a preferred configuration, the length of the stick 12 is equal to or approximately the width of standard rolls of wrapping paper, which come in widths of 24, 30, 36, 42, and 48 inches. As such the stick 12 can be between about 24 and about 36 inches in length, and more generally less than 50 inches long. The stick 12 has a broad surface 14 which is used by a person to hold the tool against the paper 20. In the illustrated embodiment, the broad surface has an arch 16 extending in the direction of elongation, L. In other embodiments, the broad surface 14 of the stick 12 can have a different profile, such as flat. A bracing surface 18 is the portion of the plastic stick 12 that contacts the wrapping paper 20, and can be generally opposite the broad surface 14. In the illustrated embodiment, the bracing surface 18 extends in the direction of elongation L on each of two sides 30, 40 of the plastic stick, and is denoted 18A and 18B, but is more generally referred to as bracing surface 18.

Figure 2:
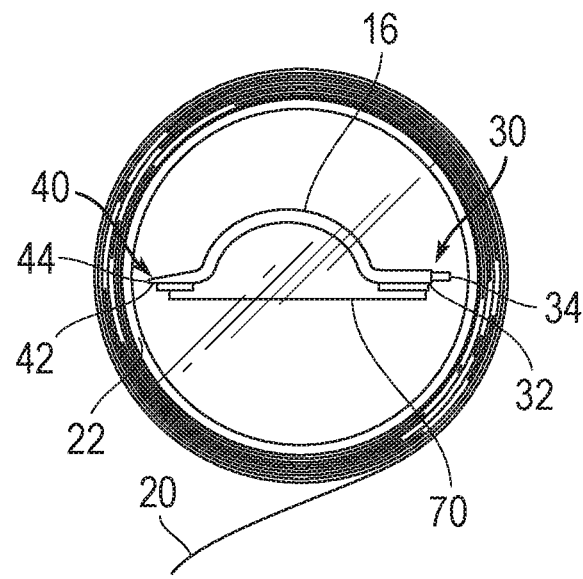
FIG. 2 is an end plan view of the tool of FIG. 1, shown encased within a roll of wrapping paper, and showing a tapered side opposite a serrated side.

The stick 12 has first and second sides 30, 40 along its length which meet the bracing surface 18 at respective first and second side edges 32, 42 (see FIG. 2). The first and second sides 30, 40 are separated by a width W in a direction perpendicular to the axis of elongation L. The width of the stick 12 is substantially less its length. In a preferred configuration, the width is selected to fit within the hollow central core 22 of a roll of wrapping paper 20 (FIG. 2). Standard rolls of wrapping paper have a hollow central core 22 on the order of 1⅜ to 1⅝ inches. Thus, the width of the stick 12 constructed in accordance with the invention is preferably less than a standard core thickness, such as less than 1.375 inches, less than 1.5 inches, or less than 1.625 inches.

With further reference to FIG. 1, the first side 30 extends linearly, parallel to the axis of elongation L, and comprises serrations 34 defined in the plastic stick 12. The serrations 32 are adjacent the bracing surface 18 and are included in at least one plane which is parallel to the wrapping paper 20 when the plastic stick 12 is disposed on top of the wrapping paper (see also FIG. 4), but can be included in multiple planes depending on the arrangement of the serrations. In a preferred configuration, the serrations extend to at least one end 50 of the length of the plastic stick 12.

The second side 40 extends linearly, parallel to the axis of elongation L, and opposite to the first side 30. The second side comprises a non-serrated edge defined in the plastic stick 12 proximate to the bracing surface 18. The non-serrated edge can be a tapered edge 44 (FIG. 1-3) or a rounded edge 46. Because the non-serrated edge extends the length of the plastic stick 12, it provides a guide for folding a cut edge of the wrapping paper in order to provide a finished edge when the cut paper is wrapped around a gift or other article. More particularly, after wrapping the cut paper about a gift or other article, the paper can be folded along the length of the plastic stick to provide a finished seam to overlap the other end of the paper and receive a piece of tape to hold the paper in the wrapped position around the gift or other article.

Optionally, the plastic stick 12 can be formed using transparent or translucent materials. This provides the advantage of being able to see the wrapping paper below the tool 10, including any pattern 24 printed on the paper. In part, this can provide a visual confirmation that the tool 10 is positioned parallel to the width of the paper, in other words, parallel to the axis of the hollow central core 22 from which the paper is unrolled/dispensed.

The illustrated embodiment has a non-skid feature 60 included on the bracing surface 18 of the plastic stick 12.

The non-skid feature is characterized in that it has a coefficient of static friction which is greater than that of the plastic of the plastic stick 12. The non-skid feature 60 can be a coating or a layer. If the plastic stick has transparency, then a suitable non-skid coating that can be used is the Rust-Oleum ExpoxyShield Anti-Slip Coating available as a spray from Rust-Oleum Corporation of Vernon Hills, Ill. (Material Safety Data Sheet: Product Name "EPDXYS SSPR 6 PK ANTI-SLIP AEROSOL," Product Identification: 268652). This coating can be applied as a spray and dries clear. Alternatively, the coating can be a conventional rubber spray. If a layer is to be applied as the non-skid feature 60, exemplary layers include rubber or cork. If the tool 10 includes an arch 16, then the non-skid feature can cover the arch 16 or can be applied on either side of the arch (as shown).

Referring now to FIG. 3, a side plan view is provided showing details of one end 50 of the plastic stick 12. FIG. 3 is taken along lines 3-3 of FIG. 1, and shows the wrapping paper 20 in contact with the bracing surface 18B. More specifically, the end 50 has a lip 70 depending downwardly below the plane of the bracing surface 18. The lip defines a wall 72 which seats an edge 26 of the wrapping paper 20 when placed on a table or other surface. The lip 70 is oriented perpendicular to the axis of elongation L and orients the wall 72 perpendicular to the axis of elongation L. The perpendicular orientation of the wall 72 causes the plastic stick to self-orient to a perpendicular orientation relative to the edge 26 of the wrapping paper (and, hence, parallel to the axis of the paper roll) when the wrapping paper edge 26 is fully seated against the wall 72. As a result, if the user positions the lip 70 beyond the edge 26 of the paper which is furthest from the user and draws the tool against the edge, the tool enables a straight cut of the paper using the serrations 34, which will now also be parallel to the axis of the rolled paper, to thereby provide approximately right-angled cuts for a better workpiece and for better future cuts since the paper has been cut along the rolled-paper axis. Optionally, the tool 10 includes the non-skid feature 60, as illustrated in the detail view of FIG. 3.

Preferably, the serrations extend over the region of the wall 72 to provide a starting point for cutting the wrapping paper, as discussed below.

Figure 4:
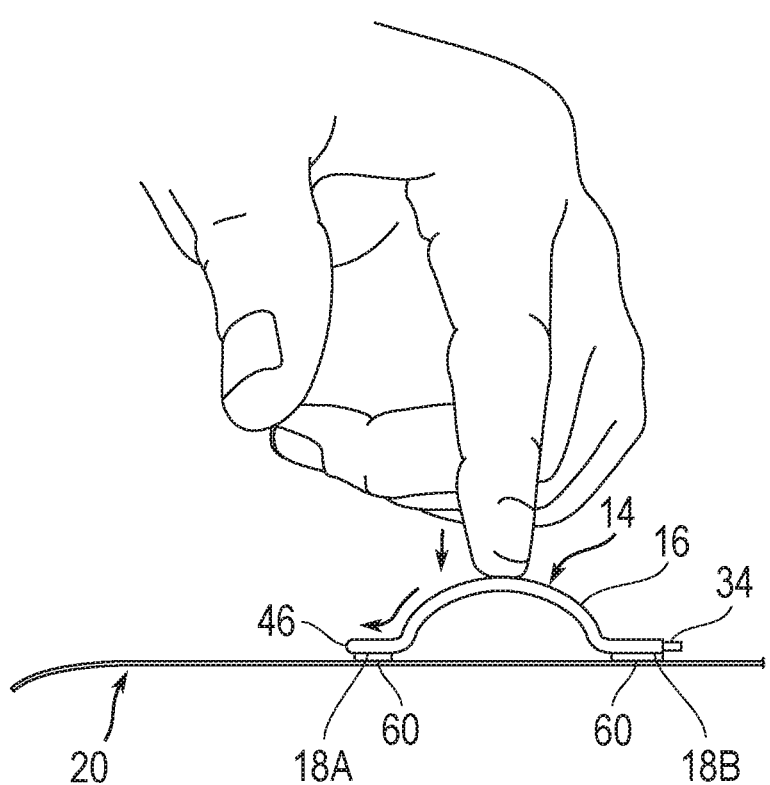
FIG. 4 is an end plan view of a variation in the construction of the tool of FIG. 1, now showing a rounded side opposite the serrated side, and illustrating flex of the tool in response to a force applied by a finger.
Figure 5:
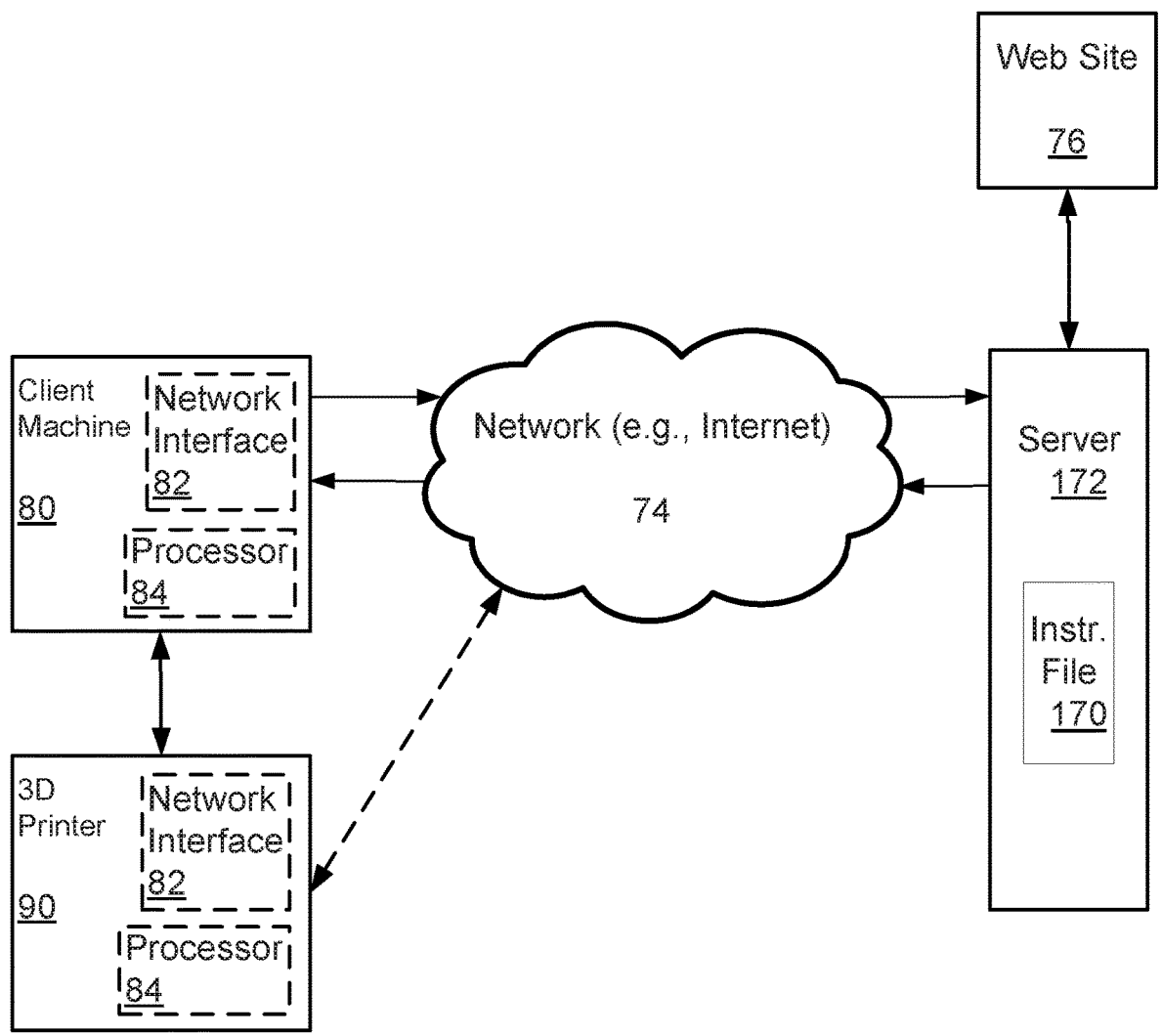
FIG. 5 is a network diagram in support of distribution of information files in support of the distributed manufacture of the tool of FIGS. 1 through 4.

Turning now to FIG. 4, the arch 16, if provided, can be pressed and caused to yield somewhat to better ensure that the tool 10 maintains an intended position on the paper 20. The arch 16 can be provided together with the non-skid feature 60, or as an alternative. As illustrated by the arrows, the downward force can impart flexing to the plastic stick 12. The plastic stick can have flexibility along the axis L such that the arch 16 has transforms from a first curvature when in a rest condition in which no force is applied (see FIG. 2) to a second, greater curvature while a force is applied to the broad surface 14 to place the arch 16 in a flexed condition (FIG. 4). The arch 16 returns to the rest condition when the force ceases to be applied to the broad surface 14.

It should be appreciated that the arch 16, if provided, imparts mechanical strength to the tool to resist breakage at points along its length.

With brief reference again to FIG. 2, the tool 10 can be included with wrapping paper as a kit. The kit can comprise wrapping paper 20 wound about an axis and having a hollow central core 22. In some constructions the wrapping paper 20 is wound about itself and the rolled paper itself defines the hollow central core 22. In other constructions, the paper is wound about a cardboard tube which defines the hollow central core 22, as shown. The plastic stick 12 can be sized and shaped so as to be disposable within the hollow central core. As noted, standard rolls of wrapping paper have a width of between 18 and 48 inches, and hollow central core on the order of 1⅜ to 1⅝ inches. Thus, the kit can include a tool 10 having a length and width sized to fit within the hollow central core 22. The tool 10 can be retained within the hollow central core 22 using a clear plastic wrap 28, such as cellophane, which seals the ends of the rolled paper and retains the plastic stick 12 within the hollow central core 22 until the wrap 28 is removed.

Alternatively, a kit can include the tool 10 on the outside of a paper roll. When the tool 10 has an arch 16, the first curvature in the rest-condition can be selected to complement that radius of curvature of a wound roll of wrapping paper to permit the tool 10 to be packaged outside the wound roll.

In use, the tool 10 can be retrieved from a kit of the type described above or otherwise obtained. A desired length of wrapping paper is dispensed on a surface such as a table top. For instance, a ten inch square object requires 40 inches of material to cover it, without any overlap of material, and if the user has a 42 inch wide roll of paper (sufficient to cover 4 sides of the object), then approximately 20 inches of paper would be dispensed onto the table top (to have sufficient wrapping paper to cover the remaining two sides). The user positions the tool 10 on top of the wrapping paper 20 with the serrations 34 aligned along the line of the desired paper cut. If the tool 10 includes the lip 70, the user positions the lip 70 beyond the edge 26 of the paper which is furthest from the user and draws the tool against the edge 26. The edge 26 engages the wall 72 of the lip 70 which self-orients the tool 10 to a perpendicular orientation relative to the edge 26 of the wrapping paper. The user presses downward on the broad surface 14, preferably within a foot of the end 50.

In some implementations, pressing down on the broad surface 14 causes the arch 16 to flex, if an arch is included, and in any embodiment in which the arch 16 is provided, the arch 16 provides a mechanical advantage because the pressure on the wrapping paper 20 is increased due to the area of contact of bracing surfaces 18 being less than the area of the broad surface 14 being pressed by the user. This helps stabilize the position of the tool 10 relative to the wrapping paper 20. In embodiments in which the non-skid feature 60 is provided, the tool 10 assumes a generally stable position on the wrapping paper even before the user presses upon the broad surface 14, but it is important to press down on the broad surface 14 to secure the tool 10 in one position.

Cutting proceeds by movement of the paper relative to the tool in an upward direction starting at the end 50, which is the end furthest from the user, and lifting the paper toward the user and the serrations 34. For wide rolls of wrapping paper, a uniform cut is better ensured by pausing the cutting and changing the location where the user presses downward on the broad surface 14 to be closer to the midpoint. The lifting and cutting of the wrapping paper 20 against the serrations 34 can continue until the entire workpiece is cut from the roll.

Once separated, the tool 10 can be positioned in the same manner described above onto the workpiece in order to provide a fold line to conceal the cut edge. The tool is positioned this time with the non-serrated second side 40 proximate to the cut edge, in the range of a ½ inch to two inches from the cut edge. The paper can be folded upward against the second side 40, the tool then moved away, and the fold completed to conceal the cut edge. Because of the length of the tool 10, the fold can be established in one step using the second side 40 as a guide.

As noted, the tool 10 can be made in a variety of ways, but if made by a 3D printer, in accordance with another aspect of the invention, an instruction file 170 can comprise a computer-aided design/computer-aided manufacture ("CAD"/"CAM") file or files, such as can be defined, at least in part, using a 3D scanner. 3D scanners are known in the art and are configured to collect visual data and produce, point clouds of geometric samples of the surface of the subject, Non-Uniform Rational Basis Spline (NURB) models to represent curves and surfaces, voxels (3-D picture elements), or 2-dimensional slices, any of which can result in an instruction file 170 that can be used by a 3D printer to form a three-dimensional shape from loose material (e.g., by sintering, fusing, etc.). In particular, the data collected by a 3D scanner is used in a reconstruction process to extrapolate the shape of the tool 10. The scanned data can be provided to a CAD designer to edit and establish the content of the instruction file 170, in some circumstances. An example of a 3D scanner available on the market is the Matter and Form 3D Scanner, available from Matter and Form, Inc. of Toronto, Canada.

The instruction file 170 can be supplied to a user from a hardware server 172 that is accessible through a network 74, such as the Internet. For instance, a website 76 can make one or more instruction files 170 available for download by users at various locations around the world. A user can select a particular instruction file and download it into a client machine 80, which is a hardware device connected to the network through a network interface 82 for transfer to a 3D printer 90, or it can be downloaded directly to the 3D printer, which also is a hardware device. Exemplary 3D printers include models available from Shapeways, Inc. of New York, N.Y. and Makerbot Industries, LLC of Brooklyn, N.Y. Such 3D printers can be directly connected to a client machine 80, connected to the client machine through a local area network (not shown), or connected to the client machine through a broader network such as network 74. The instruction file downloaded by the user has a single purpose of providing instructions to a hardware processor 84 used by the 3D printer to define actions to be taken at the 3D printer in order to manufacture the tool 12. The processor 84 typically is a hardware component of the 3D printer 90, but can be a component of another device, such as the client machine 80. The actions to be taken include sintering or fusing of material at some locations and not others, all in accordance with the instruction file 170.

The invention has been described with regard to certain embodiments thereof to aid in an understanding thereof, but the invention itself is more broadly defined by the recitations in the claims appended hereto, and equivalents of such recitations, and the claims are to be read with that in mind.

I claim:

1. A tool for use with wrapping paper, manufactured by a process comprising the step of:
causing a 3D printer to make the tool using an instruction file which is accessible to the 3D printer, the instruction file including instructions for a hardware processor which define actions to be taken at and by the 3D printer to manufacture the tool,
wherein the tool manufactured in accordance with the instruction file comprises:
a unitary, plastic stick having a length which extends linearly along an axis of elongation, a broad surface, a bracing surface which is positionable so as to be positioned on top of and in contact with the wrapping paper for restraining the paper from movement under the tool, first and second sides along the length which meet the bracing surface at respective first and second side edges, and a lip depending downward from the bracing surface of the plastic stick, wherein the first side extends parallel to the axis of elongation and comprises serrations defined in the plastic stick adjacent the bracing surface,
wherein the second side extends parallel to the axis of elongation and opposite to the first side and comprises a non-serrated edge defined in the plastic stick proximate to the bracing surface,
wherein the first and second sides are separated by a width in a direction perpendicular to the axis of elongation which is substantially less than the length,
wherein the lip is oriented perpendicular to the axis of elongation and defines a wall below the plane of the bracing surface, which is perpendicular to the axis of elongation,
wherein the wall defines a seat for an edge of the wrapping paper on top of which the bracing surface is positionable, and
wherein the wall defined by the lip is configured to self-orient the tool to be perpendicular to the edge of the wrapping paper when the wrapping paper edge is fully seated against the wall as a result of positioning the tool on top of and in contact with the wrapping paper for restraining the paper from movement under the tool and enabling a perpendicular cut.

2. The tool manufactured by the process of claim 1, wherein the instruction file has a single purpose of providing instructions to the hardware processor used by the 3D printer to define the actions to be taken at and by the 3D printer in order to manufacture the tool.

3. The tool manufactured by the process of claim 1, wherein the actions to be taken at and by the 3D printer in order to manufacture the tool include sintering loose material, and wherein the causing step responds to the instruction file by causing the 3D printer to sinter loose material at some locations and not others into the three-dimensional shape of the tool.

4. The tool manufactured by the process of claim 1, wherein the actions to be taken at and by the 3D printer in order to manufacture the tool include fusing loose material, and wherein the causing step responds to the instruction file by causing the 3D printer to fuse loose material at some locations and not others into the three-dimensional shape of the tool.

5. The tool manufactured by the process of claim 1, wherein the hardware processor is a component of the 3D printer.

6. The tool manufactured by the process of claim 1, wherein the hardware processor is a component of a client machine.

7. The tool manufactured by the process of claim 1, further comprising the step of downloading the instruction file from a hardware server.

8. The tool manufactured by the process of claim 7, wherein the step of downloading the instruction file comprises downloading the instruction file from a website.

9. The tool manufactured by the process of claim 1, wherein the instruction file comprises one or more computer-aided design/computer-aided manufacture files.

10. The tool manufactured by the process of claim 1, wherein the broad surface of the tool manufactured in accordance with the instruction file further comprises an arch extending in the direction of elongation between the first and second sides, and wherein an area of contact of the bracing surface is less than the area of the broad surface.

11. The tool manufactured by the process of claim 10, wherein the plastic stick comprising the tool manufactured in accordance with the instruction file has a flexibility, wherein the arch has a first curvature in a rest condition and a second, greater curvature in a flexed condition, wherein the arch moves between the rest condition and the flexed condition in response to a manual force being applied to the broad surface.

12. The tool manufactured by the process of claim 1, wherein the lip depends downward from at least one end of the bracing surface of the plastic stick.

13. The tool manufactured by the process of claim 1, wherein the serrations of the first side of the tool manufactured in accordance with the instruction file extend to at least one end of the length of the plastic stick.

14. The tool manufactured by the process of claim 1, wherein the non-serrated edge of the second side of the tool manufactured in accordance with the instruction file is either tapered or rounded.

15. The tool manufactured by the process of claim 1, wherein the plastic stick comprising the tool manufactured in accordance with the instruction file is transparent.

16. The tool manufactured by the process of claim 1, wherein the plastic stick comprising the tool manufactured in accordance with the instruction file is translucent.

\* \* \* \* \*